United States Patent
Tsukizawa et al.

(10) Patent No.: US 9,264,913 B2
(45) Date of Patent: Feb. 16, 2016

(54) WIRELESS COMMUNICATION DEVICE, TRANSMITTER, RECEIVER, AND BEAM-FORMING CONTROL METHOD

(71) Applicant: Panasonic Corporation, Osaka (JP)

(72) Inventors: Takayuki Tsukizawa, Kanagawa (JP); Noriaki Saito, Tokyo (JP); Kenji Miyanaga, Kanagawa (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 14/623,597

(22) Filed: Feb. 17, 2015

(65) Prior Publication Data

US 2015/0249491 A1    Sep. 3, 2015

(30) Foreign Application Priority Data

Feb. 28, 2014    (JP) .................................. 2014-039446

(51) Int. Cl.
| | |
|---|---|
| *H04B 7/02* | (2006.01) |
| *H04B 7/06* | (2006.01) |
| *H04B 7/08* | (2006.01) |
| *H04W 16/28* | (2009.01) |

(52) U.S. Cl.
CPC ............. *H04W 16/28* (2013.01); *H04B 7/0682* (2013.01); *H04B 7/0851* (2013.01); *H04B 7/0894* (2013.01)

(58) Field of Classification Search
CPC .. H04B 7/0617; H04B 7/0413; H04B 7/0851; H04B 7/086; H04B 7/06; H04B 7/08; H04B 7/0634; H04B 7/0865; H04B 7/0682; H04B 7/088; H04W 16/28; H01Q 3/2605; H01Q 3/36; H01Q 3/38; H01Q 3/267; H01Q 3/30; H04L 1/06; H04L 2025/03426; H04L 27/2675
USPC .......... 375/267, 295, 299, 316, 347; 455/101, 455/132
See application file for complete search history.

(56) References Cited

U.S. PATENT DOCUMENTS

| | | | | |
|---|---|---|---|---|
| 7,539,458 | B2 * | 5/2009 | Jafarkhani | H04B 7/0617 342/368 |
| 7,642,962 | B2 * | 1/2010 | Tomita | H01Q 3/2605 342/367 |
| 8,743,914 | B1 * | 6/2014 | Jensen | H04B 7/086 370/310 |
| 9,100,074 | B1 * | 8/2015 | Zhang | H04B 7/0626 |
| 2007/0093274 | A1 * | 4/2007 | Jafarkhani | H04B 7/0617 455/562.1 |
| 2009/0015473 | A1 * | 1/2009 | Tomita | H04B 7/0865 342/367 |
| 2011/0211490 | A1 * | 9/2011 | Nikula | H04B 7/086 370/252 |
| 2013/0223487 | A1 | 8/2013 | Zhou | |

FOREIGN PATENT DOCUMENTS

JP    2013-179423    9/2013

* cited by examiner

*Primary Examiner* — Tesfaldet Bocure (74) *Attorney, Agent, or Firm* — Seed IP Law Group PLLC (57) ABSTRACT

A wireless communication device of the present disclosure has: a transmitter having a plurality of transmission circuit branches; a receiver having a plurality of reception circuit branches; a transmission phase switch; a reception phase switch; and a phase/transmission-reception controller, and has a beam-forming function. When phase switching is performed during a plurality of training packets for setting directivity, the phase/transmission-reception controller controls the transmission phase switch and the reception phase switch by setting a same phase for each of m (m being an integer of 2 or more) number of continuous training packets. In addition, the phase/transmission-reception controller performs control such that the transmission of the transmitter and the reception of the receiver are set to an OFF state in at least one or more training packets from the beginning of the m number of continuous training packets.

9 Claims, 8 Drawing Sheets

WIRELESS COMMUNICATION DEVICE, TRANSMITTER, RECEIVER, AND BEAM-FORMING CONTROL METHOD

CROSS REFERENCES TO RELATED APPLICATIONS

This application claims priority to Japanese Patent Application No. 2014-039446, filed on Feb. 28, 2014, the contents of which are hereby incorporated by reference.

BACKGROUND

1. Technical Field

The present disclosure relates to a wireless communication device, a transmitter, a receiver, and a beam-forming control method.

2. Description of the Related Art

Wireless communication devices that are mainly used in microwave and millimeter-wave bands are configured having a transmitter and a receiver. Wireless communication standards for millimeter-wave bands include IEEE (Institute of Electrical and Electronics Engineers, Inc.) 802.11ad, which establishes beam-forming technology that uses a plurality of antennas and changes the directivity of signals to perform transmission and reception.

Figure 1A:
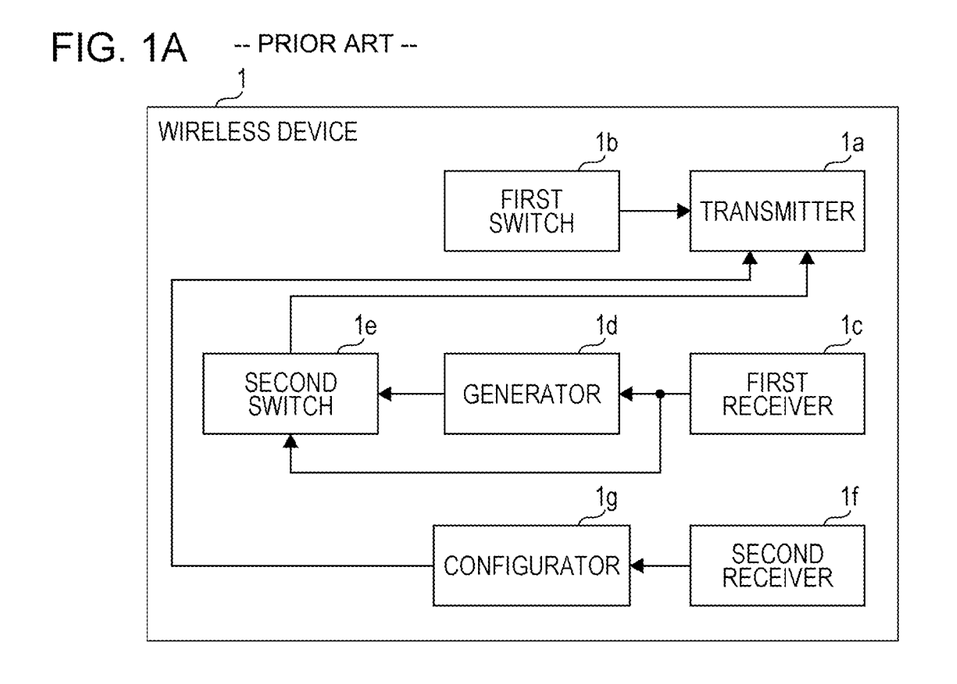
FIGS. 1A to 1C are drawings illustrating the configuration and operation of the wireless device described in Japanese Unexamined Patent Application Publication No. 2013-179423.
Figure 1B:
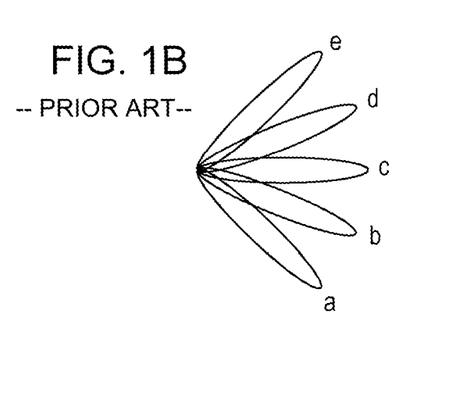
Figure 1C:
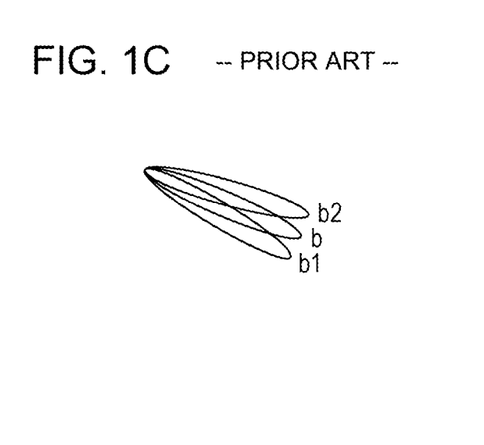

An example of the beam-forming technology specified in IEEE 802.11ad is given below (Japanese Unexamined Patent Application Publication No. 2013-179423). FIGS. 1A to 1C are drawings illustrating the configuration and operation of a wireless device described in Japanese Unexamined Patent Application Publication No. 2013-179423.

A wireless device 1 has a transmitter 1a, a first switch 1b, a first receiver 1c, a generator 1d, a second switch 1e, a second receiver 1f, and a configurator 1g. FIGS. 1B and 1C depicted below the wireless device 1 in FIG. 1A depict transmission beam patterns of the transmitter 1a.

In the wireless device 1, the transmitter 1a wirelessly transmits a signal, and the first switch 1b switches the transmission beam pattern of the transmitter 1a that wirelessly transmits the signal. For example, the first switch 1b sets the transmission beam pattern of the transmitter 1a to transmission beam pattern a depicted in FIG. 1B. Next, the first switch 1b switches the transmission beam pattern of the transmitter 1a to transmission pattern b. Similarly, the first switch 1b switches the transmission beam pattern of the transmitter 1a in the order of transmission beam pattern c to e. In other words, the first switch 1b switches the transmission beam pattern of the transmitter 1a in such a way as to become the transmission beam patterns a, b, c, d, and e.

The first receiver 1c receives, from a reception device, a transmission beam pattern having good reception quality from among the transmission beam patterns switched by the first switch 1b. The generator 1d generates a transmission beam pattern in which the phase of the transmission beam pattern received by the first receiver 1c has been rotated. For example, the transmission beam pattern b is fed back from the reception device, and the first receiver 1c deems that the transmission beam pattern b has been received. This beam pattern b is referred to as the best sector (BS), and is defined as the sector having the best directivity from among the beam patterns a to e.

Figure 2:
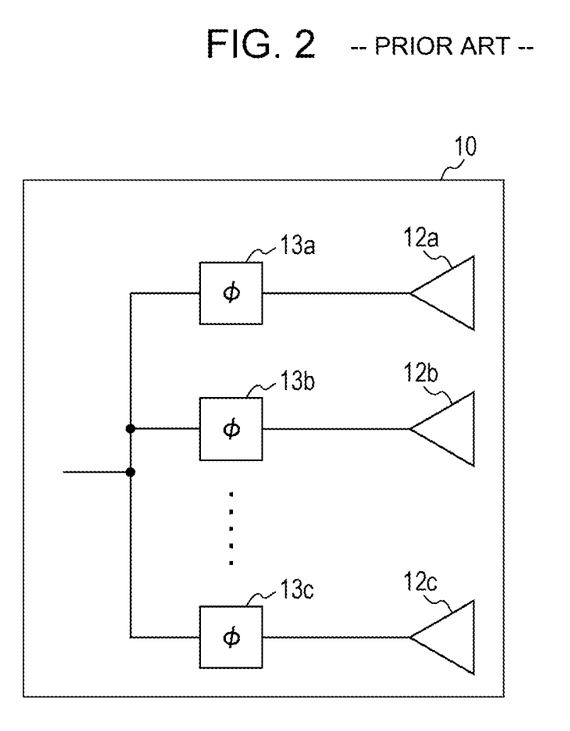
FIG. 2 is a drawing depicting an exemplary configuration of a wireless device having a transmission beam pattern switching function.

FIG. 2 is a drawing depicting an exemplary configuration of a wireless device having a transmission beam pattern switching function. A wireless device 10 has w number of antennas 12a, 12b . . . 12c and phase shifters 13a, 13b . . . 13c, and switches beam patterns by applying a phase difference with the phase shifters 13a to 13c to each branch including the antennas.

IEEE 802.11ad specifies a sequence referred to as a beam refinement protocol (BRP) for additionally carrying out fine adjustment of the patterns and additionally selecting the optimum beam pattern after the best sector has been selected. When BRP is carried out, as depicted in FIG. 1C, the generator 1d generates transmission beam patterns b1 and b2 in which the phase of the transmission beam pattern b has been rotated.

For example, the generator 1d rotates the phase of the transmission beam pattern b received by the first receiver 1c, between the transmission beam pattern b received by the first receiver 1c and the transmission beam patterns a and c adjacent to that transmission beam pattern b. Consequently, the phase of transmission beam pattern b1 lies between the transmission beam patterns b and a. Furthermore, the phase of transmission beam pattern b2 lies between the transmission beam patterns b and c.

The second switch 1e switches the transmission beam pattern of the transmitter 1a with the transmission beam pattern received by the first receiver 1c and the transmission beam pattern generated by the generator 1d. For example, according to the aforementioned example, as depicted in FIG. 1C, the second switch 1e sequentially switches the transmission beam pattern of the transmitter 1a in such a way as to become each of the transmission beam patterns b1, b, and b2.

The second receiver 1f receives, from a reception device, a transmission beam pattern having good reception quality from among the transmission beam patterns switched by the second switch 1e. For example, the transmission beam pattern b2 is fed back from the reception device, and the second receiver 1f deems that the transmission beam pattern b2 has been received. This beam pattern b2 is the best sector selected by way of BRP, this has better reception quality than the beam pattern b selected prior to BRP, and further satisfactory wireless communication can be performed.

SUMMARY

However, in the case of the configuration of the conventional example depicted in FIGS. 1A to 1C, because the first switch and the second switch are used in order to switch the beam pattern, the circuit scale becomes large.

Thus, one non-limiting and exemplary embodiment provides a wireless communication device, a transmitter, a receiver, and a beam-forming control method with which a beam pattern can be switched in a short time without causing an increase in circuit scale.

Additional benefits and advantages of the disclosed embodiments will be apparent from the specification and Figures. The benefits and/or advantages may be individually provided by the various embodiments and features of the specification and drawings disclosure, and need not all be provided in order to obtain one or more of the same.

In one general aspect, the techniques disclosed here feature a wireless communication device including: a phase switch that switches a phase of a signal for at least one of a plurality of transmission circuit branches and a plurality of reception circuit branches; and a phase controller that controls phase switching performed by the phase switch, by setting a same phase for each of m (m being an integer of 2 or more) number of consecutive training packets among a plurality of training packets included in the signal when the phase switch switches the phase during the plurality of training packets, the plurality of training packets being used for setting directivity controller.

These general and specific aspects may be implemented using a system, a method, and a computer program, and any combination of systems, methods, and computer programs.

According to the present disclosure, a beam pattern can be switched in a short time without causing an increase in circuit scale.

DETAILED DESCRIPTION

Underlying Knowledge Forming Basis of the Embodiments of the Present Disclosure

In a wireless communication device in which beam-forming technology is applied, with regard to beam patterns in transmission and reception, the phases of circuits of each branch in a plurality of transmission-reception circuit branches are controlled to switch the directivity of each branch.

Here, it is assumed that the beam pattern switching by BRP that is standardized in IEEE 802.11ad is to be applied. In BRP of IEEE 802.11ad, the time in which a phase is switched is extremely short, and it is necessary to perform switching within a 64-symbol period (within approximately 36 ns), for example. In the case where, in a wireless communication device, a phase shifter that switches phases is configured from an analog circuit, it is extremely difficult to switch a phase within a short period such as within a 64-symbol period. In this case, it is difficult to satisfy the timing of the BRP standard of IEEE 802.11ad. Furthermore, in the configuration of the conventional example depicted in FIGS. 1A to 1C, the first switch and the second switch are included in order to switch beam patterns, and therefore the circuit scale becomes large.

Therefore, the following embodiments provide examples of a wireless communication device and a beam-forming control method with which a beam pattern can be switched in a short time without causing an increase in circuit scale, in a wireless communication device in which beam-forming technology is applied. Furthermore, examples are provided of a wireless communication device and a beam-forming control method with which the timing of the BRP standard of IEEE 802.11ad can be satisfied without causing an increase in circuit scale.

EMBODIMENTS OF THE PRESENT DISCLOSURE

Embodiment 1

Figure 3:
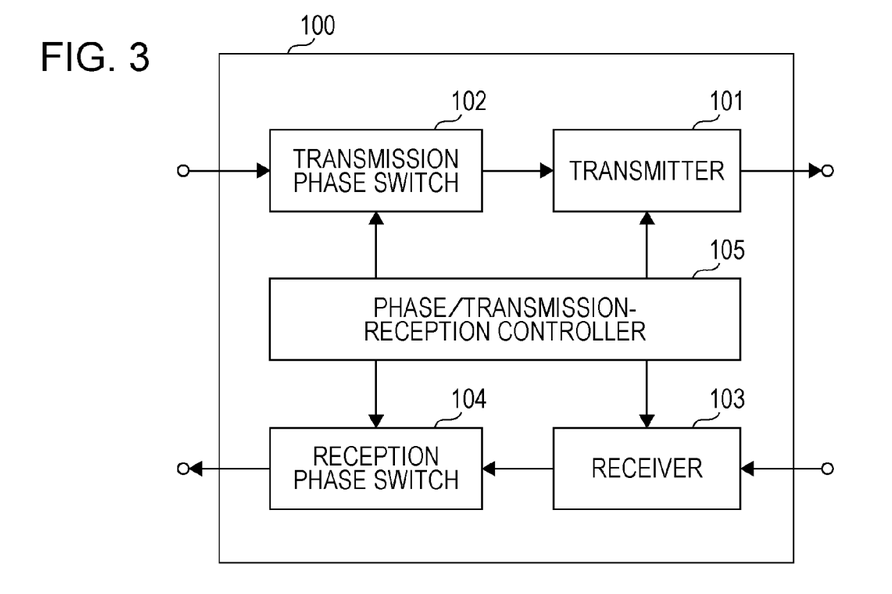
FIG. 3 is a block diagram depicting the configuration of a wireless communication device according to embodiment 1 of the present disclosure.

FIG. 3 is a block diagram depicting the configuration of a wireless communication device according to embodiment 1 of the present disclosure. In FIG. 3, an example of the configuration of a transceiver corresponding to a microwave/millimeter-wave circuit is depicted as embodiment 1 of a wireless communication device.

A wireless communication device 100 has a transmitter 101, a transmission phase switch 102, a receiver 103, a reception phase switch 104, and a phase/transmission-reception controller 105. In the exemplary configuration of the present embodiment, the wireless communication device 100 has the transmission phase switch 102 and the reception phase switch 104 as phase switches that switch phases of a plurality of circuit branches for forming a beam pattern that indicates transmission and reception directivity. The phase/transmission-reception controller 105 realizes the functions of a phase controller that controls phase switching, a transmission controller that controls transmission, and a reception controller that controls reception.

First, the operation during transmission performed by the transmitter of the wireless communication device 100 is described. In the wireless communication device 100, the transmitter 101 wirelessly transmits a signal, which is sent as a radio signal by an undepicted plurality of antenna branches that is connected to an output terminal. The transmitter 101, as a plurality of transmission circuit branches, has a plurality of power amplifiers, and amplifies the plurality of power of radio-frequency (RF) signal branches and outputs each signal to each antenna.

In the transmission phase switch 102, a signal is input from an undepicted transmission signal generator that is connected to an input terminal. The transmission phase switch 102 then, in order to switch the transmission beam pattern of the signal that is wirelessly transmitted from the transmitter 101, switches the phase of each branch with respect to the plurality of signal branches of the transmitter 101. The transmission phase switch 102, as a plurality of transmission circuit branches, has a plurality of phase shifters and frequency conversion circuits, converts the signal to be transmitted into a radio frequency, and controls the phases of the circuits of each branch. It should be noted that a frequency conversion circuit may be provided in the transmitter 101. Furthermore, the phase switching of each branch by the transmission phase switch 102 may be carried out in another frequency band such as a baseband signal band or a local signal band rather than being limited to an RF signal band.

Figure 4A:
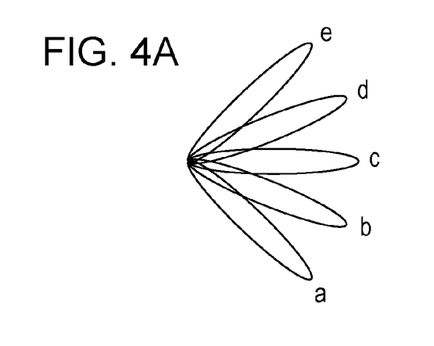
FIGS. 4A and 4B are drawings depicting transmission-reception beam patterns in the wireless communication device of the present embodiment.
Figure 4B:
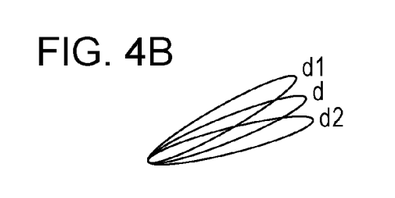

FIGS. 4A and 4B are drawings depicting transmission-reception beam patterns in the wireless communication device of the present embodiment. FIG. 4A depicts beam patterns obtained when rough control of directivity is carried out in order to select the best sector, and FIG. 4B depicts beam patterns obtained when fine adjustment of directivity in a BRP sequence is carried out.

For example, the transmission phase switch 102 switches the transmission beam pattern of the transmitter 101 to become a, b, c, d, and e in sector units as depicted in FIG. 4A in order to first roughly control directivity and select the best sector. The receiver 103 receives beam pattern information relating to the best sector (this is referred to as BS1) having good reception quality, from among the switched transmission beam patterns, from a reception-side wireless communication device, which is the communication counterpart.

The wireless communication device 100 then additionally carries out fine adjustment of the phase by way of the BRP sequence, and generates a transmission beam pattern having better reception quality. In the fine adjustment of directivity in the BRP sequence, for example, directivity is finely switched between sectors as depicted in FIG. 4B. In the depicted example, in the case where the best sector is d, the transmission beam pattern is switched between d1, d, and d2. The receiver 103 receives beam pattern information obtained after the fine adjustment in which the reception quality becomes further satisfactory, from among the switched transmission beam patterns, from the reception-side wireless communication device that is the communication counterpart.

Figure 5:
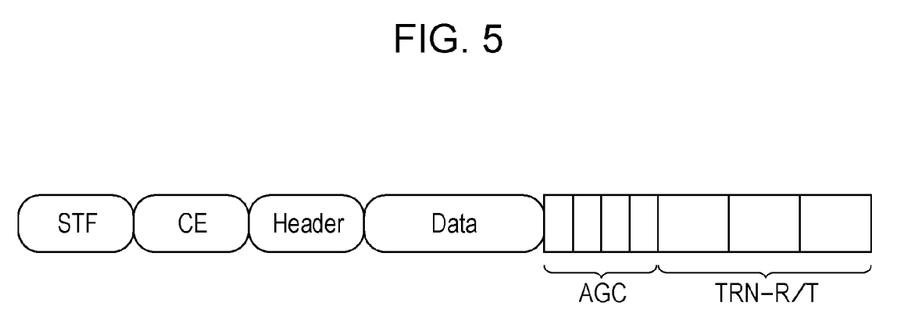
FIG. 5 is a drawing depicting a packet structure specified by IEEE 802.11ad.

Next, the operation during transmission of the wireless communication device 100 of the present embodiment in the BRP sequence is described. Here, the phase setting and transmission control operation during transmission in the transmitter of the wireless communication device 100 are described using FIG. 3, FIGS. 4A and 4B, FIG. 5, and FIGS. 6A to 6D. FIG. 5 is a drawing depicting a packet structure specified by IEEE 802.11ad. FIGS. 6A to 6D are drawings illustrating the phase switching timing of the transmitter in the present embodiment.

In IEEE 802.11ad, as depicted in FIG. 5, packets that are transmitted and received are configured having a preamble configured from a short training field (STF), a channel estimation (CE), and a header that are used in normal communication, data that includes the actual transmission information, and AGC and TRN-R/T that are used thereafter in the BRP sequence.

The STF is a known signal sequence for adjusting the gain of a reception circuit in such a way that the level of a reception signal becomes suitable in a receiver. The CE is a signal sequence used for training for correcting carrier frequency deviation and modulation frequency deviation and so forth of a communication channel. The header is a signal sequence that includes ID information and so forth of each packet.

Figure 6A:
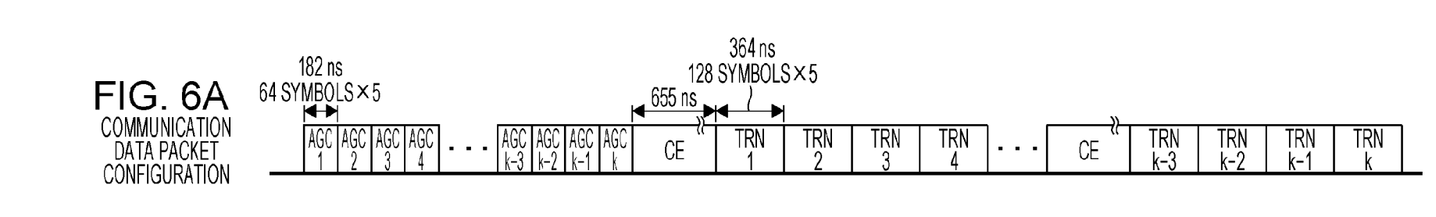
FIGS. 6A to 6D are drawings illustrating the phase switching timing of a transmitter in embodiment 1 of the present disclosure.

FIG. 6A depicts the detailed configuration of the AGC and TRN-R/T of a BRP sequence, in a packet of communication data. The BRP sequence is configured having automatic gain control (AGC) with which k (k≥n, n being an integer of 2 or more) number of reception gain setting values are decided, and TRN-R/T with which k number of transmission-reception trainings are carried out and signal quality is observed. The AGC fields and TRN-R/T fields together form k number of pairs. Here, each of the fields of AGC1, AGC2 . . . AGCk and TRN1, TRN2 . . . TRNk are defined as a training packet (BRP packet). Thus, the AGC fields and the TRN-R/T fields each have k number of training packets.

In the case where directivity is to be roughly controlled and the best sector selected, the packet depicted in FIG. 5 is transmitted in each of the beam patterns a, b, c, d, and e depicted in FIG. 4A. At such time, the intervals between packets are 1 µs or 3 µs for example, and are sufficiently longer than the phase switching timing of the BRP sequence.

Figure 6B:
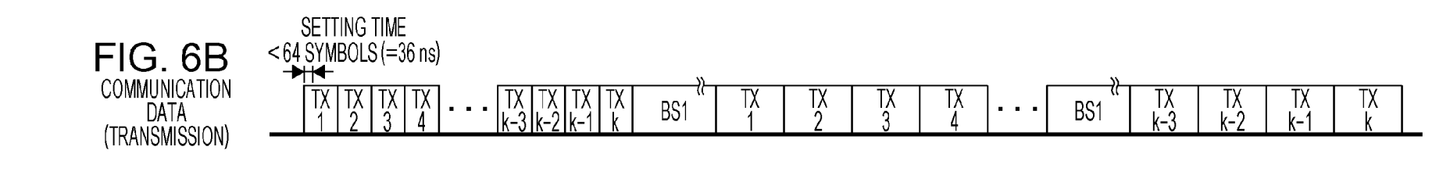

Furthermore, when the directivity is to be finely adjusted by way of the BRP sequence, an operation such as the following is carried out. To begin, as depicted in FIG. 6B, the wireless communication device 100 switches from beam pattern TX1 to TXk and transmits signals in k number of AGC fields from AGC1 to AGCk.

In the reception-side wireless communication device, the signal level of a reception signal is different in each AGC field, and therefore the optimum gain setting value is decided in the reception-side wireless communication device so as to be optimum when reception quality is measured in each beam pattern of TX1 to TXk.

Next, the wireless communication device 100 switches from beam pattern TX1 to TXk in k number of TRN-R/T fields from TRN1 to TRNk and transmits the same signals as the beam patterns transmitted in the k number of AGC fields. In the reception-side wireless communication device, the reception gain setting values decided in the prior k number of AGC fields are used to observe the reception quality of each of the k number of sent beam patterns of TX1 to TXk. The reception-side wireless communication device then passes beam pattern information relating to the beam pattern for which the reception quality was the best, to the transmission-side wireless communication device 100.

It should be noted that, with regard to directivity switching of the beam patterns TX1 to TXk, it is possible to use various methods such as discretely switching direction in accordance with a prescribed rule, randomly switching direction, and continuously switching direction in a sequential manner. FIGS. 6A to 6D depict phase setting in the form of steps in order to simplify the depiction; however, the actual phases become values that correspond to the directivity switching method.

Furthermore, a CE is inserted at every four TRN-R/T fields as depicted in FIG. 6A. The wireless communication device 100, in the CE period, transmits a signal by beam pattern BS1 of the best sector that has been decided by roughly controlling directivity, and channel estimation is carried out at the reception-side wireless communication device. It should be noted that the phase of the beam pattern BS1 is depicted in FIGS. 6A to 6D as a fixed value (initial setting value) in order to simplify the description; however, the actual phase is a value that corresponds to the best sector selection result.

Here, as depicted in FIGS. 6A and 6B, an AGC has a symbol length of 64 symbols×5 (1 symbol length is $1/f\_s$, and $f\_s$ is sampling frequency, $f\_s=1.76$ GHz), and a TRN-R/T has a symbol length of 128 symbols×5. In each AGC, beam pattern switching is carried out in the leading 64-symbol (approximately 36 ns) period, and a reception gain setting value is decided in the remaining 64 symbols×4 period. Therefore, it is necessary to complete phase switching for the circuits of each branch in a short time of approximately 36 ns or less.

It should be noted that, in the case where transmission is carried out in a beam pattern TXk in both AGCk and TRNk training packets, AGCk and TRNk are each sometimes referred to as TXk training packets, as depicted in FIG. 6B.

For example, in the case where, in a training packet (AGC1, TRN1) of TX1 (k=1), transmission has been carried out without phase switching being completed in 36 ns, an operation that sets reception gain prior to phase switching completion is started in AGC1. In this case, there are occasions where a setting value that is different to the gain setting value that should have originally been set is decided in AGC1, and observation of reception quality is started in TRN1 using a value that is different to the gain setting value that should have originally been set. At such time, because observation of reception quality is started in a state that is different to the phase setting of TX1, reception quality at the original phase setting of TX1 cannot be observed, and the phase setting having the best reception quality can no longer be suitably selected. Furthermore, in the case where all of the phase switching has not been completed within 36 ns in TX1 to TXk, the reception quality observed in TRN1 to TRNk is not accurate, and therefore a suitable beam pattern can no longer be selected. In particular, in the case where the transmission phase switch 102 of the wireless communication device 100 is configured from an analog circuit, it is extremely difficult to switch phases within the short period of 36 ns.

Figure 6C:
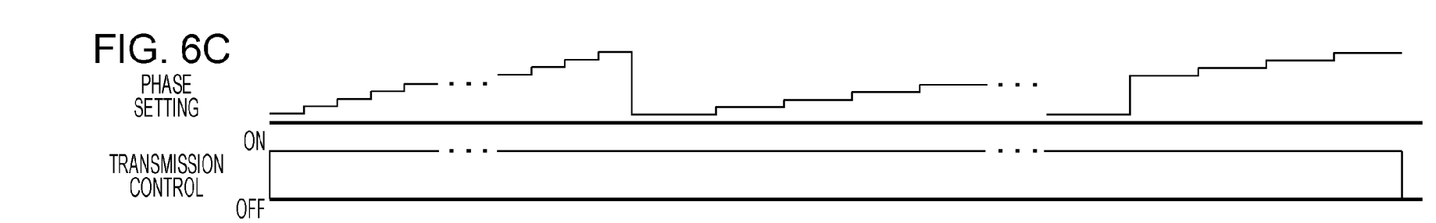
Figure 6D:
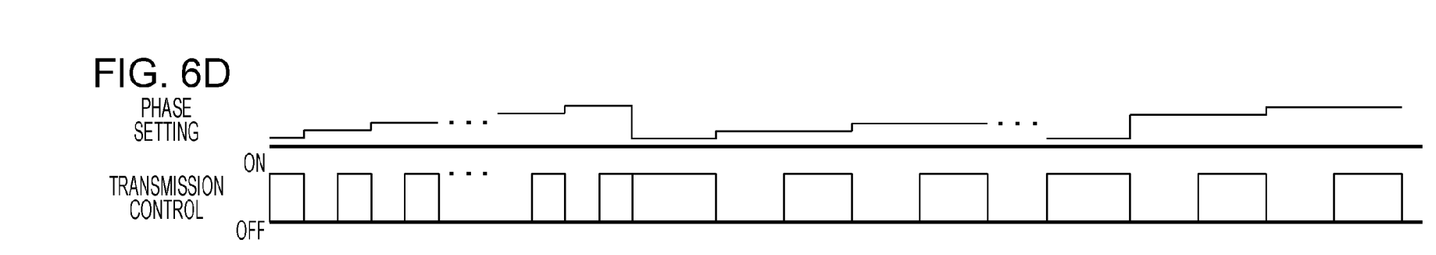

Accordingly, in the present embodiment, as depicted in FIG. 6D, phase control is carried out by the phase/transmission-reception controller 105, and the phase switching of the circuits of each branch in the transmission phase switch 102 is controlled. Thus, the aforementioned problems can be resolved.

The phase switching operation during transmission of the present embodiment is described in detail using FIGS. 6C and 6D. FIG. 6C depicts a general phase switching method in a BRP sequence, and FIG. 6D depicts the phase switching method of the present embodiment.

In the general phase switching method, as depicted in FIG. 6C, all phase settings are switched from TX1 to TXk in AGC1 to AGCk and TRN1 to TRNk. In contrast, in the present embodiment, as depicted in FIG. 6D, the transmission phase switch 102 is controlled by the phase/transmission-reception controller 105 in such a way that, for example, TX1 and TX2 and also TX3 and TX4 (AGC1 and AGC2, AGC3 and AGC4, TRN1 and TRN2, and TRN3 and TRN4), which are m=2 continuous training packets, have the same phase setting.

Here, the phase setting of TX1 and TX2 is PH1, and the phase setting of TX3 and TX4 is PH2. In the case where the switching of the phase to the phase setting PH1 in TX1 has not been completed within the period of 64 symbols (36 ns), the observation of reception quality at PH1 is inadequate in the general phase switching method.

In contrast, in the present embodiment, it is sufficient as long as phase switching to PH1 is completed by the time (period of 64 symbols×6) obtained by combining all of the period (64 symbols×5) of AGC1 and the period of the first 64 symbols of AGC2. Therefore, compared to the general phase switching method, the delay time for phase switching becomes six times longer, and it becomes easy to sufficiently switch the phase within this delay time even when the transmission phase switch 102 is configured from an analog circuit. It then becomes possible to observe reception quality at the phase setting PH1 without any problems. It should be noted that, although the number of training packets having the same phase setting was m=2 in the aforementioned example, it is not particularly necessary to limit the number of training packets to m=2, and, for example, m=3 is also permissible. In the case of m=3, the delay time for phase switching becomes 13 times longer than the general phase switching method.

Furthermore, in the general phase switching method, it is assumed that, for example, transmission is carried out prior to phase switching completing in 36 ns in the training packet of TX1 (k=1), and the observation of reception quality is started prior to phase switching completion in TRN1. Here, when the beam pattern of TX1 in which phase switching has not been completed has the best reception quality with respect to the beam patterns of TX1 to TXk, directivity is set in such a way that the beam pattern TX1 is used in actual wireless communication. At such time, in the actual wireless communication, communication is carried out at the phase setting of k=1 rather than in a state in which phase switching is incomplete. Therefore, the reception quality is different from the state in the BRP sequence, and in the worst-case scenario, it is possible that communication may not be established (unable to transmit or receive data).

Accordingly, in the present embodiment, as depicted in FIG. 6D, transmission control is carried out by the phase/transmission-reception controller 105, and the ON/OFF of the transmission operation in the transmitter 101 is controlled. Thus, the aforementioned problem can be resolved.

The transmission operation of the present embodiment will be described using FIGS. 6C and 6D. FIG. 6C depicts a general transmission control method in a BRP sequence, and FIG. 6D depicts the transmission control method of the present embodiment.

In the general phase switching method, as depicted in FIG. 6C, the transmission circuit of the transmitter 101 is ordinarily in an ON state in the BRP sequence period. In contrast, in the present embodiment, as depicted in FIG. 6D, in the case where, for example, TX1 and TX2 and also TX3 and TX4, which correspond to m=2 continuous training packets, have the same phase setting, the transmitter 101 is controlled by the phase/transmission-reception controller 105 in such a way that the transmission circuit of the transmitter 101 is ON only for the period of the $m^{th}$ TX2 and TX4. It should be noted that, in the case where m≥3, the transmission operation may be set to OFF in the periods of at least the first TX1 and TX4, and the transmission operation may be set to ON in the other periods.

Owing to the transmission control of the present embodiment, the wireless communication device 100 can suppress the transmission of a signal having a phase that has been set while phase switching is incomplete, even when phase switching has not been completed in TRN1 and TRN3 as in the periods of the first TX1 and TX3. Therefore, at the reception-side wireless communication device, it is possible to suppress the erroneous determination that either of the beam patterns of the TX1 and TX3 periods has the best reception quality. Thus, it is possible for any of the signals in an $m^{th}$ training packet to be selected as the signal having the best reception quality, as in TX2 and TX4 in which phase switching has been completed.

Heretofore, a description has been given regarding a method for switching phases during transmission of the wireless communication device 100; however, the same effect can be obtained also during reception. The operation during reception of the receiver of the wireless communication device 100 is described using FIG. 3 and FIG. 4.

In the wireless communication device 100, the receiver 103 wirelessly receives a signal by an undepicted plurality of antenna branches that are connected to an input terminal. The receiver 103, as a plurality of reception circuit branches, has a plurality of amplifiers, and amplifies a plurality of radio-frequency signal branches.

The reception phase switch 104, in order to switch the reception beam pattern of the signal wirelessly received at the receiver 103, switches the phase of each branch with respect to the plurality of signal branches of the receiver 103. The reception phase switch 104, as a plurality of reception circuit branches, has a plurality of phase shifters and frequency conversion circuits, controls the phases of the circuits of each branch, and converts the received signal from a radio frequency into a baseband frequency. It should be noted that a frequency conversion circuit may be provided in the receiver 103. Furthermore, the phase switching of each branch by the reception phase switch 104 may be carried out in another frequency band such as a baseband signal band or a local signal band rather than being limited to an RF signal band. The signal received via the receiver 103 and the reception phase switch 104 is output to an undepicted reception signal processing unit that is connected to an output terminal, and decoding and so forth of the signal is carried out for the reception data to be reproduced.

For example, the reception phase switch 104 switches the reception beam pattern of the receiver 103 to become a, b, c, d, and e in sector units as depicted in FIG. 4A in order to first roughly control directivity and select the best sector. The receiver 103 transmits beam pattern information relating to the best sector (this is referred to as BS2) having good reception quality, from among the switched reception beam patterns, to a transmission-side wireless communication device, which is the communication counterpart.

The wireless communication device 100 then additionally carries out fine adjustment of the phase by way of the BRP sequence, and generates a reception beam pattern having better reception quality. In the fine adjustment of directivity in the BRP sequence, for example, directivity is finely switched between sectors as depicted in FIG. 4B. In the depicted example, in the case where the best sector is d, the reception beam pattern is switched between d1, d, and d2. The receiver 103 transmits beam pattern information obtained after the fine adjustment in which the reception quality becomes further satisfactory, from among the switched reception beam patterns, to the transmission-side wireless communication device that is the communication counterpart.

Figure 7A:
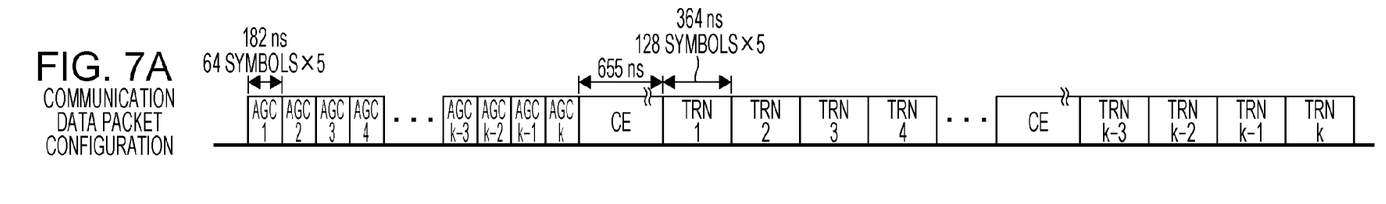
FIGS. 7A to 7C are drawings illustrating the phase switching timing of a receiver in embodiment 1 of the present disclosure.
Figure 7B:
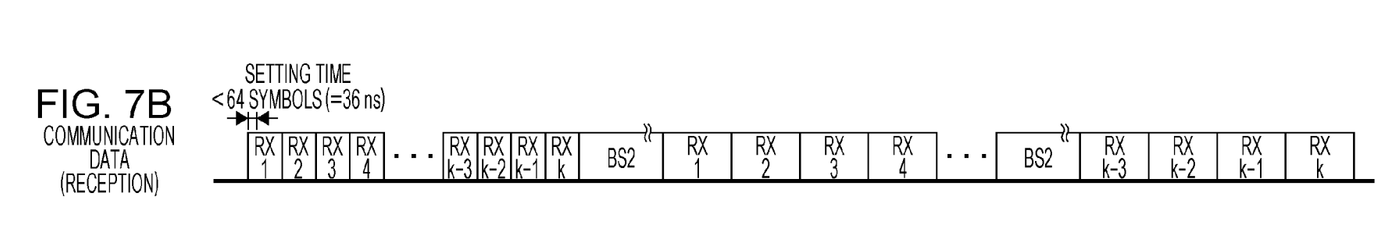
Figure 7C:
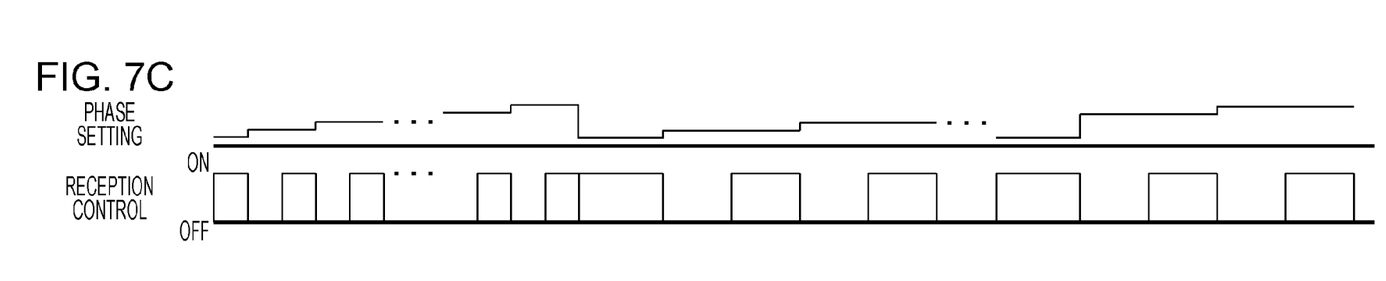

Next, the operation during reception of the wireless communication device 100 of the present embodiment in the BRP sequence is described. Here, the phase setting and reception control operation during reception in the receiver of the wireless communication device 100 are described using FIG. 3, FIGS. 4A and 4B, and FIGS. 7A to 7C. FIGS. 7A to 7C are drawings illustrating the phase switching timing of the receiver in the present embodiment.

FIG. 7A depicts the same BRP sequence as FIG. 6A. To begin, as depicted in FIG. 7B, the wireless communication device 100 switches from beam pattern RX1 to RXk and receives signals in k number of AGC fields from AGC1 to AGCk. Furthermore, the wireless communication device 100 decides the optimum gain setting value in the receiver 103 so as to be optimum when reception quality is measured in each beam pattern of RX1 to RXk.

Next, the wireless communication device 100 switches between and receives the beam patterns RX1 to RXk in k number of TRN-R/T fields from TRN1 to TRNk, and uses the reception gain setting values decided in the prior k number of AGC fields to observe the reception quality of each of the beam patterns. The wireless communication device 100 then passes beam pattern information relating to the beam pattern for which the reception quality was the best, to the transmission-side wireless communication device.

It should be noted that, with regard to the directivity switching of the beam patterns RX1 to RXk, it is possible to use various methods such as discretely switching direction in accordance with a prescribed rule, randomly switching direction, and continuously switching direction in a sequential manner. FIG. 7A to 7C depict phase setting in the form of steps in order to simplify the depiction; however, the actual phases become values that correspond to the directivity switching method.

Furthermore, the wireless communication device 100, in the CE periods, receives a signal by the beam pattern BS2 of the best sector decided by roughly controlling directivity, and carries out channel estimation. It should be noted that the phase of the beam pattern BS2 is depicted in FIGS. 7A to 7C as a fixed value (initial setting value) in order to simplify the description; however, the actual phase is a value that corresponds to the best sector selection result.

Also in the case of reception, in the same way as with transmission, in each AGC, beam pattern switching is carried out in the leading 64-symbol (approximately 36 ns) period, and a reception gain setting value is decided in the remaining 64 symbol×4 period. Therefore, it is necessary to complete phase switching for the circuits of each branch in a short time of approximately 36 ns or less.

It should be noted that, in the case where reception is carried out in a beam pattern RXk in both AGCk and TRNk training packets, AGCk and TRNk are each sometimes referred to as an RXk training packet, as depicted in FIG. 7B.

For example, in the case where, in a training packet (AGC1, TRN1) of RX1 (k=1), reception has been carried out without phase switching being completed in 36 ns, an operation that sets reception gain prior to phase switching completion is started in AGC1. In this case, there are occasions where a setting value that is different to the original setting value is decided in AGC1, and observation of reception quality is started in TRN1 using the value that is different to the gain setting value that should have originally been set. At such time, because observation of reception quality is started in a state that is different to the phase setting of RX1, reception quality at the original phase setting of RX1 cannot be observed, and the phase setting having the best reception quality can no longer be suitably selected. Furthermore, in the case where all of the phase switching has not been completed within 36 ns in RX1 to RXk, the reception quality observed in TRN1 to TRNk is not accurate, and therefore a suitable beam pattern can no longer be selected. In particular, in the case where the reception phase switch 104 of the wireless communication device 100 is configured from an analog circuit, it is extremely difficult to switch phases within the short period of 36 ns.

Accordingly, in the present embodiment, as depicted in FIG. 7C, phase control is carried out by the phase/transmission-reception controller 105, and the phase switching of the circuits of each branch in the reception phase switch 104 is controlled. Thus, the aforementioned problems can be resolved.

The phase switching operation during reception of the present embodiment is described in detail using FIG. 7C. As depicted in FIG. 7C, in the same way as during transmission, the reception phase switch 104 is controlled by the phase/transmission-reception controller 105 in such a way that, for example, RX1 and RX2 and also RX3 and RX4 (AGC1 and AGC2, AGC3 and AGC4, TRN1 and TRN2, and TRN3 and TRN4), which are m=2 continuous training packets, have the same phase setting. Here, the phase setting of RX1 and RX2 is PH3, and the phase setting of RX3 and RX4 is PH4.

In the present embodiment, it is sufficient as long as phase switching to PH3 is completed by the time (period of 64 symbols×6) obtained by combining all of the period (64 symbols×5) of AGC1 and the period of the first 64 symbols of AGC2, even when phase switching to the phase setting PH3 is not completed within 64 symbols in RX1. Therefore, compared to the general phase switching method, the delay time for phase switching becomes six times longer, and it becomes easy to sufficiently switch the phase within this delay time even when the reception phase switch 104 is configured from an analog circuit. It then becomes possible to observe reception quality at the phase setting PH3 without any problems. It should be noted that, although the number of training packets having the same phase setting was m=2 in the aforementioned example, it is not particularly necessary to limit the number of training packets to m=2, and, for example, m=3 is also permissible. In the case of m=3, the delay time for phase switching becomes 13 times longer than the general phase switching method.

Furthermore, also during reception, in the same way as during transmission, reception control is carried out by the phase/transmission-reception controller 105, and the ON/OFF of the reception operation in the receiver 103 is controlled, as depicted in FIG. 7C. In the case where, for example, RX1 and RX2 and also RX3 and RX4, which correspond to m=2 continuous training packets, have the same phase setting, the receiver 103 is controlled by the phase/transmission-reception controller 105 in such a way that the reception circuit of the receiver 103 is ON only for the period of the $m^{th}$ RX2 and RX4. It should be noted that, in the case where m≥3, the reception operation may be set to OFF in the periods of at least the first RX1 and RX4, and the reception operation may be set to ON in the other periods.

Owing to the reception control of the present embodiment, the wireless communication device 100 can suppress the reception of a signal while phase switching is incomplete, even when phase switching has not been completed in TRN1 and TRN3 as in the first RX1 and RX3 periods. Therefore, the wireless communication device 100 can suppress the erroneous determination that either of the beam patterns of the RX1 and RX3 periods has the best reception quality. Thus, it is possible for any of the signals in an $m^{th}$ training packet to be selected as the signal having the best reception quality, as in RX2 and RX4 in which phase switching has been completed.

Embodiment 2

Figure 8:
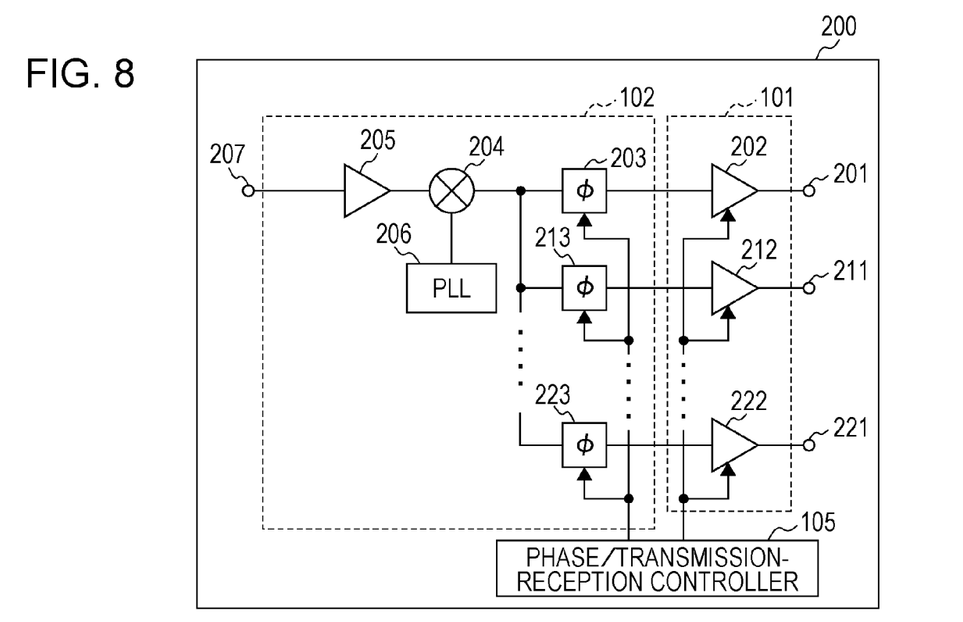
FIG. 8 is a block diagram depicting the configuration of a transmission circuit of a wireless communication device according to embodiment 2 of the present disclosure.

FIG. 8 is a block diagram depicting the configuration of a transmission circuit of a wireless communication device according to embodiment 2 of the present disclosure. In FIG. 8, a specific exemplary configuration of a transmission circuit of a transmitter is depicted as embodiment 2 of a wireless communication device.

A transmission circuit 200 is configured having a mixer 204, a variable gain amplifier 205, a PLL 206, phase shifters 203, 213 . . . 223, and power amplifiers (PA) 202, 212 . . . 222. Here, the section that includes the mixer 204, the variable gain amplifier 205, the PLL 206, and the phase shifters 203 to 223 functions as the transmission phase switch 102 of FIG. 3, and the section that includes the power amplifiers 202 to 222 functions as the transmitter 101 of FIG. 3.

In the transmission circuit 200, a baseband signal of a transmission signal that has been input to an input terminal 207 is amplified by a suitable gain in the variable gain amplifier 205 for the baseband, and input to the mixer 204, which is an example of a frequency converter. Furthermore, a local signal that is generated in the PLL 206, which is an example of a local oscillator, is input to the mixer 204. In the mixer 204, the baseband signal and the local signal are mixed and frequency-converted to a high frequency band, and an RF signal is obtained. In the mixer 204, the variable gain amplifier 205 and the PLL 206 are connected to input terminals, and the plurality of phase shifters 203 to 223 are connected in parallel to an output terminal.

The RF signal is then divided into j (j being an integer of 2 or more) number of branches and input to j number of phase shifters 203, 213 . . . 223, which change the phases of the j number of branches, for the phases thereof to be set. In the present embodiment, the phase shifters 203 to 223 switch the phases of the plurality of transmission circuit branches in an RF signal band. Thereafter, the power of the RF signals is amplified in j number of power amplifiers 202, 212 . . . 222, and the RF signals are wirelessly transmitted from an undepicted antenna via j number of output terminals 201, 211 . . . 221.

In the transmission circuit 200, the phases of the phase shifters 203, 213 . . . 223 can be varied to suitable values, and the signals wirelessly transmitted from the antenna are combined in space, and a beam pattern having desired directivity can thereby be generated. At such time, the phase/transmission-reception controller 105 controls the phase setting of the phase shifters 203 to 223 and the ON/OFF operation of the power amplifiers 202 to 222 as illustrated in FIG. 6D.

It should be noted that, although the phase/transmission-reception controller 105 controls the ON/OFF operations of the power amplifiers 202 to 222 in the aforementioned example, the present disclosure is not limited to this configuration, and it goes without saying that the same effect can be obtained if some of the power amplifiers, only the output stage or only the input stage for example, are ON/OFF controlled rather than all of the power amplifiers being ON/OFF controlled, and if a signal is not transmitted from the antenna when set to OFF. Furthermore, all of the phase shifters 203 to 223 other than those that switch phases may be ON/OFF controlled.

Embodiment 3

Figure 9:
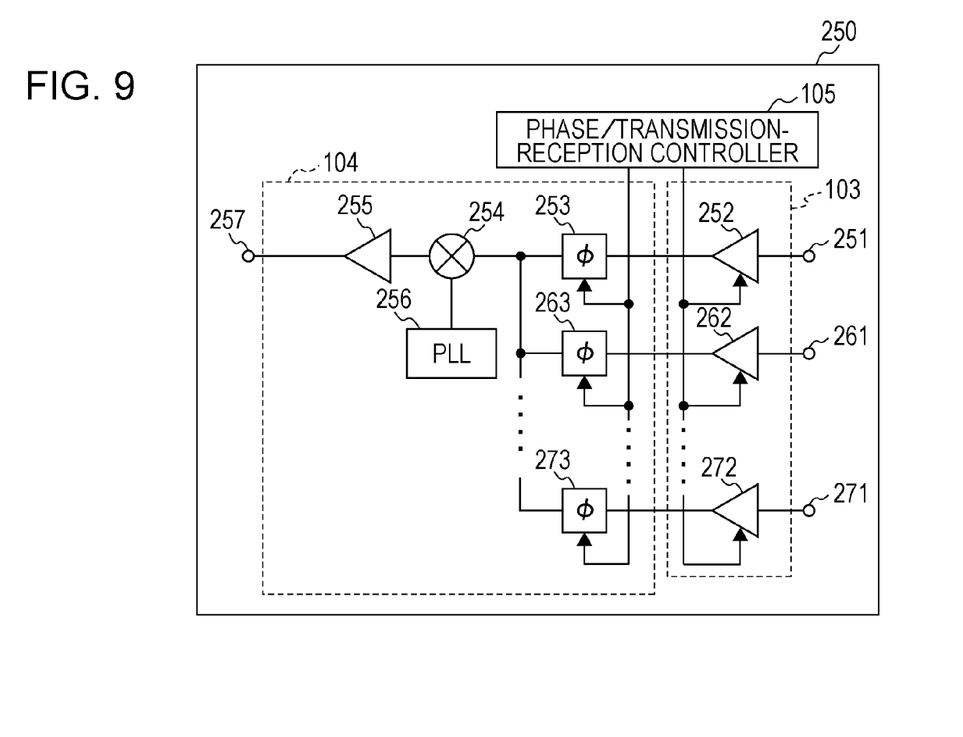
FIG. 9 is a block diagram depicting the configuration of a reception circuit of a wireless communication device according to embodiment 3 of the present disclosure.

FIG. 9 is a block diagram depicting the configuration of a reception circuit of a wireless communication device according to embodiment 3 of the present disclosure. In FIG. 9, a specific exemplary configuration of a reception circuit of a receiver is depicted as embodiment 3 of a wireless communication device.

A reception circuit 250 includes low-noise amplifiers (LNA) 252, 262 . . . 272, phase shifters 253, 263 . . . 273, a mixer 254, a variable gain amplifier 255, and a PLL 256. Here, the section that includes the low-noise amplifiers 252 to 272 functions as the receiver 103 of FIG. 3, and the section that includes the phase shifters 253 to 273, the mixer 254, the PLL 256, and the variable gain amplifier 255 functions as the reception phase switch 104 of FIG. 3.

In the reception circuit 250, an RF signal of a reception signal that is input to input terminals 251, 261 . . . 271 via h (h being an integer of 2 or more) number of antennas that are not depicted is amplified in the low-noise amplifiers 252, 262 . . . 272 of h number of branches, and input to the phase shifters 253, 263 . . . 273 that change the phases of the h number of branches. In the phase shifters 253, 263 . . . 273, the phase of each branch is set to a suitable value, and the RF signals thereof are combined and input to the mixer 254. In the present embodiment, the phase shifters 253 to 273 switch the phases of the plurality of reception circuit branches in an RF signal band.

A local signal generated in the PLL 256 is then input to the mixer 254 and, in the mixer 254, the RF signal and the local signal are mixed and frequency-converted to a baseband band, and a baseband signal is obtained. Thereafter, the baseband signal is amplified by a suitable gain in the baseband variable gain amplifier 255, and is output from an output terminal 257.

In the reception circuit 250, the phases of the phase shifters 253, 263 . . . 273 can be varied to suitable values, and the signals received from the antennas are combined, and a beam pattern having desired directivity can thereby be generated. At such time, a suitable gain setting value is decided in such a way that the gain of the low-noise amplifiers 252 to 272 and the variable gain amplifier 255 is changed in a suitable manner and is optimum when reception quality is measured.

Furthermore, as illustrated in FIG. 7D, the phase/transmission-reception controller 105 controls the phase setting of the phase shifters 253 to 273, and the ON/OFF operation of the low-noise amplifiers 252 to 272.

It should be noted that, although the phase/transmission-reception controller 105 controls the ON/OFF operations of the low-noise amplifiers 252 to 272 in the aforementioned example, the present disclosure is not limited to this configuration, and it goes without saying that the same effect can be obtained if some of the low-noise amplifiers, only the output stage or only the input stage for example, are ON/OFF controlled rather than all of the low-noise amplifiers being ON/OFF controlled, and if a signal is not output from the output terminal 257 when set to OFF. Furthermore, all of the phase shifters 253 to 273 other than those that switch phases may be ON/OFF controlled.

Embodiment 4

Figure 10A:
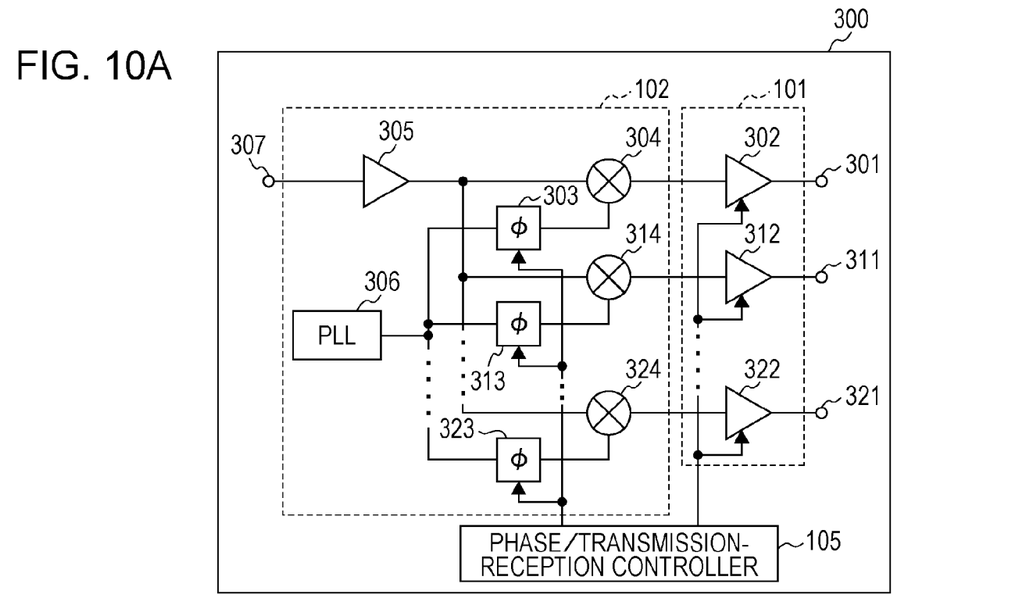
FIGS. 10A and 10B are block diagrams depicting the configuration of a transmission circuit of a wireless communication device according to embodiment 4 of the present disclosure.
Figure 10B:
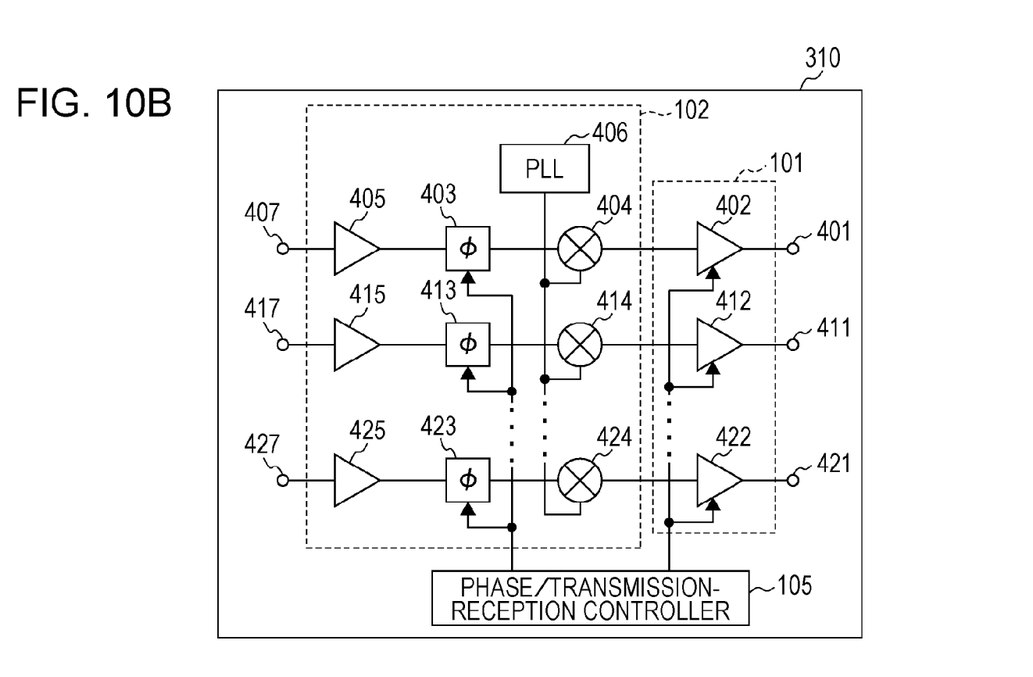

FIGS. 10A and 10B are block diagrams depicting the configuration of a transmission circuit of a wireless communication device according to embodiment 4 of the present disclosure. In FIGS. 10A and 10B, modified examples of the configuration of a transmission circuit of a transmitter are depicted as embodiment 4 of a wireless communication device. FIG. 10A depicts a first modified example, and FIG. 10B depicts a second modified example.

In the transmission circuit of embodiment 2 depicted in FIG. 8, the phase shifters that switch phases operate in an RF signal band; however, the present disclosure is not limited to this configuration.

A transmission circuit 300 of the first modified example depicted in FIG. 10A is configured having a variable gain amplifier 305, a PLL 306, phase shifters 303, 313 . . . 323, mixers 304, 314 . . . 324, and power amplifiers (PA) 302, 312 . . . 322.

In the transmission circuit 300, a baseband signal that is input to an input terminal 307 is amplified by a suitable gain in the variable gain amplifier 305 for the baseband, divided into j (j being an integer of 2 or more) number of branches, and input to the mixers 304, 314 . . . 324. Furthermore, a local signal generated in the PLL 306 is divided into j number of signals, these signals are input to j number of the phase shifters 303, 313 . . . 323 that change the phases of the j number of branches, and the phases are set. In the first modified example, the phase shifters 303 to 323 switch the phases of the plurality of transmission circuit branches in a local signal band.

At such time, the phase/transmission-reception controller 105 controls the phase setting of the phase shifters 303 to 323 as illustrated in FIG. 6D. The local signals of each branch are then input to the mixers 304, 314 . . . 324, the baseband signals of the j number of branches and the local signals are mixed in the mixers 304, 314 . . . 324 and frequency-converted to a high frequency band, and RF signals are obtained. The power of the j number of RF signals is amplified in the power amplifiers 302, 312 . . . 322, and the RF signals are wirelessly transmitted from an undepicted antenna via j number of output terminals 301, 311 . . . 321.

A transmission circuit 310 of the second modified example depicted in FIG. 10B is configured having variable gain amplifiers 405, 415 . . . 425, a PLL 406, phase shifters 403, 413 . . . 423, mixers 404, 414 . . . 424, and power amplifiers (PA) 402, 412 . . . 422.

In the transmission circuit 310, baseband signals of j (j being an integer of 2 or more) number of branches that are input to input terminals 407, 417 . . . 427 are each amplified by a suitable gain in the variable gain amplifiers 405, 415 . . . 425 for the baseband, and input to j number of the phase shifters 403, 413 . . . 423 that change the phases of the j number of branches.

In the phase shifters 403, 413 . . . 423, the phases of the j number of branches are set to suitable values and are input to the mixers 404, 414 . . . 424. In the second modified example, the phase shifters 403 to 423 switch the phases of the plurality of transmission circuit branches in a baseband signal band.

At such time, the phase/transmission-reception controller 105 controls the phase setting of the phase shifters 403 to 423 as illustrated in FIG. 6D. Furthermore, a local signal generated in the PLL 406 is divided into j number of signals and input to the mixers 404, 414 . . . 424, the baseband signals of each branch and the local signals are mixed and frequency-converted to a high frequency band, and RF signals are obtained. The power of the j number of RF signals is amplified in the power amplifiers 402, 412 . . . 422, and the RF signals are wirelessly transmitted from an undepicted antenna via j number of output terminals 401, 411 . . . 421.

The same effect as that of the transmission circuit 200 of embodiment 2 is obtained also in the aforementioned first modified example and the second modified example.

It should be noted that, in the reception circuit of embodiment 3 depicted in FIG. 9, although the phase shifters that switch phases operate in an RF signal band, the present disclosure is not limited to this configuration. In the same way as in the aforementioned modified examples of the transmission circuits, the same effect is obtained also with a configuration in which a phase shifter is provided in a local signal band or a baseband signal band, in a reception circuit.

The present embodiment described above is used in a beam-forming function that controls the phases of each of a plurality of transmission circuit branches and reception circuit to switch the directivity thereof, in a transmitter and receiver of a wireless communication device that is mainly used in microwave and millimeter-wave bands. In the present embodiment, phase shifters of the transmission circuit and reception circuit are controlled in such a way that m=2 or more continuous training packets (BRP packets) have the same phase setting. Thus, high-speed beam-forming control with which beam patterns are switched in a short time becomes possible without causing an increase in circuit scale. Consequently, it is possible to provide a transmitter, a receiver, a transceiver, and a wireless communication device that includes any of these, which are capable of satisfying the BRP standard of IEEE 802.11ad in, for example, a millimeter-wave band.

Summary of One Aspect of the Disclosure

The following are included as various aspects of the embodiments according to the present disclosure.

A wireless communication device of the present disclosure includes: at least one of a plurality of transmission circuit branches and a plurality of reception circuit branches; a beam-forming function that forms directivity for at least one of transmission and reception; a phase switch that switches a phase of at least one of the transmission circuit and the reception circuit; and a phase controller that controls phase switching performed by the phase switch, in which, when the phase switch switches the phase in a plurality of training packets for setting directivity, the phase controller controls the phase switching in the training packets in such a way that the same phase setting is implemented in m (m being an integer of 2 or more) number of the training packets that are continuous.

Furthermore, the wireless communication device described above may be a wireless communication device that includes: the plurality of transmission circuit branches; a transmission phase switch that switches a phase of the plurality of transmission circuit branches, as the phase switch; and a transmission controller that controls transmission performed by the plurality of transmission circuit branches, in which, when the transmission phase switch switches the phase in the plurality of training packets, the transmission controller sets transmission to OFF in at least one or more of the training packets from the beginning of the m number of the training packets that are continuous.

Furthermore, the wireless communication device described above may be a wireless communication device that includes: the plurality of reception circuit branches; a reception phase switch that switches a phase of the plurality of reception circuit branches, as the phase switch; and a reception controller that controls reception performed by the plurality of reception circuit branches, in which, when the reception phase switch switches the phase in the plurality of training packets, the reception controller sets reception to OFF in at least one or more of the training packets from the beginning of the m number of the training packets that are continuous.

Furthermore, the wireless communication device described above may be a wireless communication device in which the phase switch switches a phase of a plurality of circuit branches in any of an RF signal band, a local signal band, and a baseband signal band.

A transmitter of the present disclosure includes: a plurality of transmission circuit branches; a beam-forming function that forms directivity for transmission; a frequency converter that frequency-converts a baseband signal of a transmission signal into an RF signal; a plurality of phase shifters that are connected in parallel to the frequency converter, and switch a phase of a circuit of each system; a transmission phase controller that controls phase switching of the plurality of phase shifters; and a transmission controller that controls transmission performed by the plurality of transmission circuit branches, in which, when the plurality of phase shifters switch the phase in a plurality of training packets for setting directivity, the transmission phase controller controls the phase switching in the training packets in such a way that the same phase setting is implemented in m (m being an integer of 2 or more) number of the training packets that are continuous, and the transmission controller sets transmission to OFF in at least one or more of the training packets from the beginning of the m number of the training packets that are continuous.

A receiver of the present disclosure includes: a plurality of reception circuit branches; a beam-forming function that forms directivity for reception; a frequency converter that frequency-converts an RF signal of a reception signal into a baseband signal; a plurality of phase shifters that are connected in parallel to the frequency converter, and switch a phase of a circuit of each system; a reception phase controller that controls phase switching of the plurality of phase shifters; and a reception controller that controls reception performed by the plurality of reception circuit branches, in which, when the plurality of phase shifters switch the phase in a plurality of training packets for setting directivity, the reception phase controller controls the phase switching in the training packets in such a way that the same phase setting is implemented in m (m being an integer of 2 or more) number of the training packets that are continuous, and the reception controller sets reception to OFF in at least one or more of the training packets from the beginning of the m number of the training packets that are continuous.

A beam-forming control method of the present disclosure is a beam-forming control method of a wireless communication device including: at least one of a plurality of transmission circuit branches and a plurality of reception circuit branches; and a beam-forming function that forms directivity for at least one of transmission and reception, in which, when a phase of at least one of the transmission circuit and the reception circuit is switched in a plurality of training packets for setting directivity, phase switching in the training packets is controlled in such a way that the same phase setting is implemented in m (m being an integer of 2 or more) number of the training packets that are continuous.

Furthermore, the aforementioned beam-forming control method may be a beam-forming control method in which the wireless communication device includes the plurality of transmission circuit branches, and when phase switching of the plurality of transmission circuit branches is carried out in the plurality of training packets, the transmission performed by the plurality of transmission circuit branches is set to OFF in at least one or more of the training packets from the beginning of the m number of the training packets that are continuous.

Furthermore, the aforementioned beam-forming control method may be a beam-forming control method in which the wireless communication device includes the plurality of reception circuit branches, and when phase switching of the plurality of reception circuit branches is carried out in the plurality of training packets, the reception performed by the plurality of reception circuit branches is set to OFF in at least one or more of the training packets from the beginning of the m number of the training packets that are continuous.

Heretofore, various embodiments have been described with reference to the drawings; however, it goes without saying that the present disclosure is not restricted to these examples. It is obvious that a person skilled in the art could conceive of various altered examples or amended examples within the categories described in the claims, and naturally it is to be understood that these also belong to the technical scope of the present disclosure. Furthermore, the constituent elements in the aforementioned embodiments may be arbitrarily combined without deviating from the purpose of the disclosure.

In the aforementioned embodiments, the present disclosure has been described with examples in which hardware is used to configure the present disclosure; however, it is also possible for the present disclosure to be realized by using software in cooperation with hardware.

Furthermore, each function block used in the description of each of the aforementioned embodiments is typically realized as an LSI, which is an integrated circuit. These may be implemented separately as single chips or may be implemented as a single chip in such a way as to include some or all of the functional blocks. An LSI has been mentioned here; however, a function block may be referred to as an IC, a system LSI, a super LSI, or an ultra LSI depending on the difference in the degree of integration.

Furthermore, the circuit integration technique is not limited to an LSI, and a function block may be realized using a dedicated circuit or a general-purpose processor. After an LSI is manufactured, a field-programmable gate array (FPGA) that can be programmed, or a reconfigurable processor with which the connections and settings of circuit cells within the LSI can be reconfigured, may be used.

In addition, if circuit integration technology that replaces LSI appears as a result of another technology that is an advancement in semiconductor technology or is derived therefrom, naturally, the other technology may be used to carry out the integration of function blocks. The application and so forth of biotechnology is also a possibility.

It should be noted that it is possible for the present disclosure to be realized as a beam-forming control method that is executed in a transmitter and receiver of a wireless communication device. Furthermore, it is also possible for the present disclosure to be realized as a beam-forming control device that serves as a device having a function for executing a beam-forming control method, or as a program for causing a beam-forming control method or a beam-forming control device to be operated by a computer. In other words, the present disclosure can be realized in any of the categories of a device, a method, and a program.

The present disclosure has the effect of being able to switch a beam pattern in a short time without causing an increase in circuit scale, and is useful as a wireless communication device and a beam-forming control method and so forth used in microwave and millimeter-wave bands, for example.

What is claimed is:

1. A wireless communication device comprising:
   a phase switch that switches a phase of a signal for at least one of a plurality of transmission circuit branches and a plurality of reception circuit branches; and
   a phase controller that controls phase switching performed by the phase switch, by setting a same phase for each of m (m being an integer of 2 or more) number of consecutive training packets among a plurality of training packets included in the signal when the phase switch switches the phase during the plurality of training packets, the plurality of training packets being used for setting directivity.

2. The wireless communication device according to claim 1, further comprising:
   a plurality of transmission circuit branches; and
   a transmission controller that controls transmission performed by the plurality of transmission circuit branches, and sets transmission from the plurality of transmission circuit branches to an OFF state during at least first one or more of the m number of consecutive training packets when the transmission phase switch switches the phase during the plurality of training packets,
   wherein the phase switch comprises a transmission phase switch that switches a phase of a signal for the plurality of transmission circuit branches.

3. The wireless communication device according to claim 1, further comprising:
   a plurality of reception circuit branches; and
   a reception controller that controls reception performed by the plurality of reception circuit branches, and sets reception by the plurality of reception circuit branches to an OFF state during at least first one or more of the m number of consecutive training packets when the reception phase switch switches the phase during the plurality of training packets included in the signal,
   wherein the phase switch comprises a reception phase switch that switches a phase of the plurality of reception circuit branches.

4. The wireless communication device according to claim 1, wherein
   the phase switch switches the phase of the signal in any of an RF signal band, a local signal band and a baseband signal band.

5. A transmitter that includes a plurality of transmission circuit branches and that performs beam-forming for generating transmission directivity, the transmitter comprising:
   a frequency converter that converts a frequency band of a transmission signal from a baseband signal band into an RF signal band;
   a plurality of phase shifters that are connected in parallel to the frequency converter, wherein each of the plurality of phase shifters switches a phase of a signal for each circuit included in the plurality of transmission circuit branches;
   a transmission phase controller that controls phase switching of the plurality of phase shifters; and
   a transmission controller that controls transmission performed by the plurality of transmission circuit branches,
   wherein when the plurality of phase shifters switch the phase during a plurality of training packets included in the signal, the plurality of training packets being used for setting the transmission directivity,
   the transmission phase controller controls the phase switching by setting a same phase for each of m (m being an integer of 2 or more) number of consecutive training packets among the plurality of training packets, and
   the transmission controller sets transmission from the plurality of transmission circuit branches to an OFF state during at least first one or more of the m number of consecutive training packets.

6. A receiver that includes a plurality of reception circuit branches and performs beam-forming for generating reception directivity, the receiver comprising:
   a frequency converter that converts a frequency band of a reception signal from an RF signal band into a baseband signal band;
   a plurality of phase shifters that are connected in parallel to the frequency converter, wherein each of the plurality of phase shifters switches a phase of a signal for each circuit included in the plurality of reception circuit branches;
   a reception phase controller that controls phase switching of the plurality of phase shifters; and
   a reception controller that controls reception performed by the plurality of reception circuit branches,
   wherein when the plurality of phase shifters switch the phase during a plurality of training packets included in the signal, the plurality of training packets being used for setting the reception directivity,
   the reception phase controller controls the phase switching by setting a same phase for each of m (m being an integer of 2 or more) number of consecutive training packets among the plurality of training packets, and
   the reception controller sets reception by the plurality of reception circuit branches to an OFF state during at least first one or more of the m number of training packets.

7. A beam-forming control method of a wireless communication device comprising:
   switching a phase of a signal for at least one of the plurality of transmission circuit branches and the plurality of reception circuit branches; and
   controlling the switching step by setting a same phase for each of m (m being an integer of 2 or more) number of consecutive training packets among a plurality of training packets included in the signal when the phase of signal is switched during the plurality of training packets, the plurality of training packets being used for setting directivity.

8. The beam-forming control method according to claim 7, wherein the wireless communication device includes a plurality of transmission circuit branches, and
   wherein, when the phase of the signal is switched during the plurality of training packets included in the signal, the beam-forming control method further comprises setting transmission from the plurality of transmission circuit branches to an OFF state during at least first one or more of m number of consecutive training packets.

9. The beam-forming control method according to claim 7, wherein the wireless communication device includes a plurality of reception circuit branches, and wherein, when the phase of the signal is switched during the plurality of training packets included in the signal, the beam-forming control method further comprises setting reception by the plurality of reception circuit branches to an OFF state during at least first one or more of m number of consecutive training packets.

* * * * *